Aug. 18, 1936.     L. E. ELWELL     2,051,204
INTERNAL COMBUSTION ENGINE
Filed April 3, 1933     6 Sheets-Sheet 3

INVENTOR
LLOYD E. ELWELL
BY *Ernest L. Nallace*
ATTORNEY

Aug. 18, 1936.　　　L. E. ELWELL　　　2,051,204
INTERNAL COMBUSTION ENGINE
Filed April 3, 1933　　　6 Sheets-Sheet 4

INVENTOR
LLOYD E. ELWELL
BY Ernest L. Wallace
ATTORNEY

Aug. 18, 1936.   L. E. ELWELL   2,051,204
INTERNAL COMBUSTION ENGINE
Filed April 3, 1933   6 Sheets—Sheet 6

INVENTOR
LLOYD E. ELWELL
BY Ernest L. Wallace
ATTORNEY

Patented Aug. 18, 1936

2,051,204

UNITED STATES PATENT OFFICE 2,051,204

INTERNAL COMBUSTION ENGINE

Lloyd E. Elwell, Los Angeles, Calif.

Application April 3, 1933, Serial No. 664,060

8 Claims. (Cl. 123—62)

This invention relates to new and improved methods and means of providing and controlling the supply of air in internal combustion engines and novel means to augment and control the volume of the compression space for such engines.

The objects of my invention are to increase the power output of internal combustion engines, to decrease their weight, cost and size per unit of power, to increase their reliability and provide greater ease of starting.

Further objects and improvements will be apparent to those versed in the art in the following description and accompanying drawings showing some of the typical applications of my invention.

Figure 1:
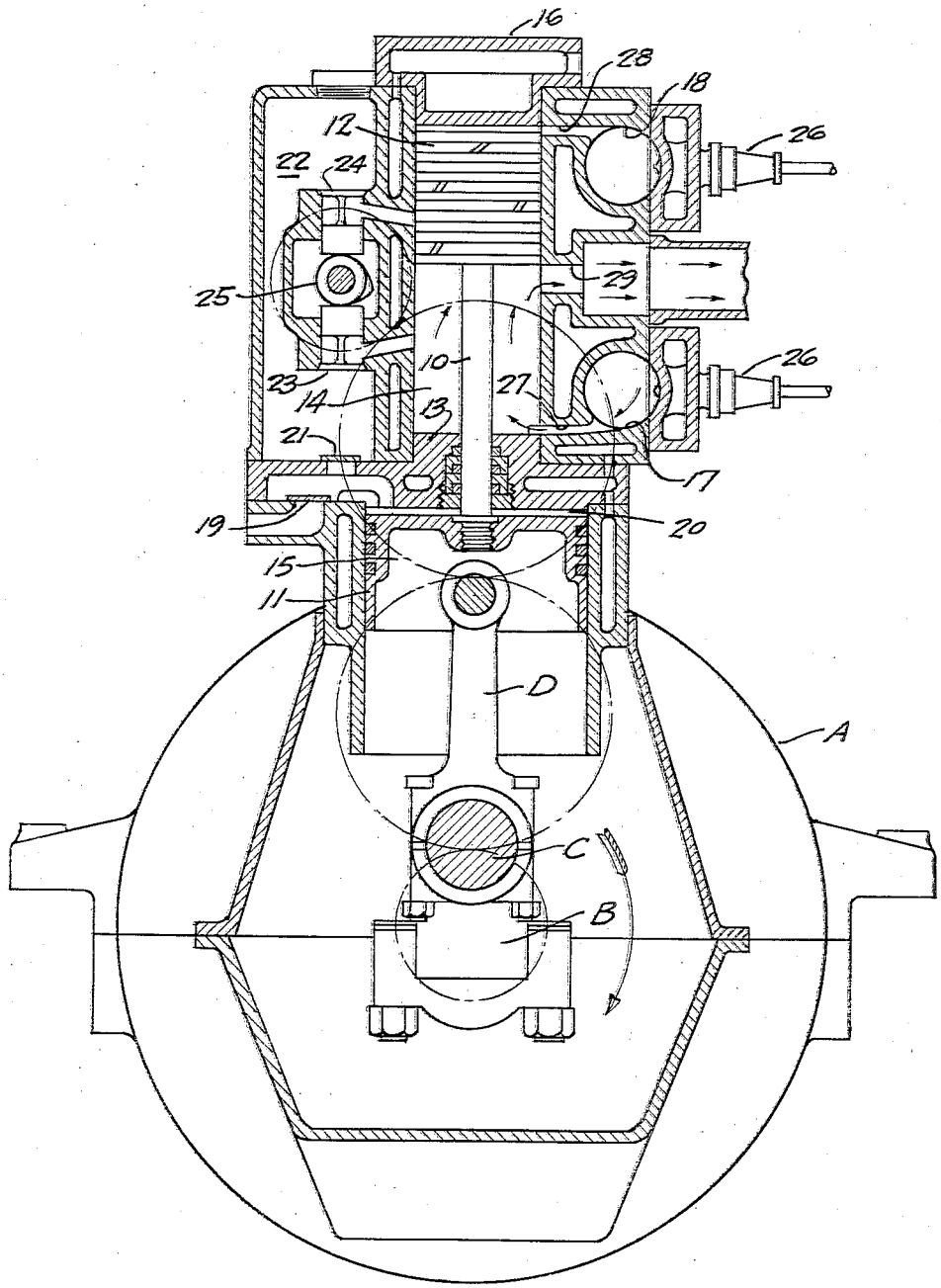
Figure 2:
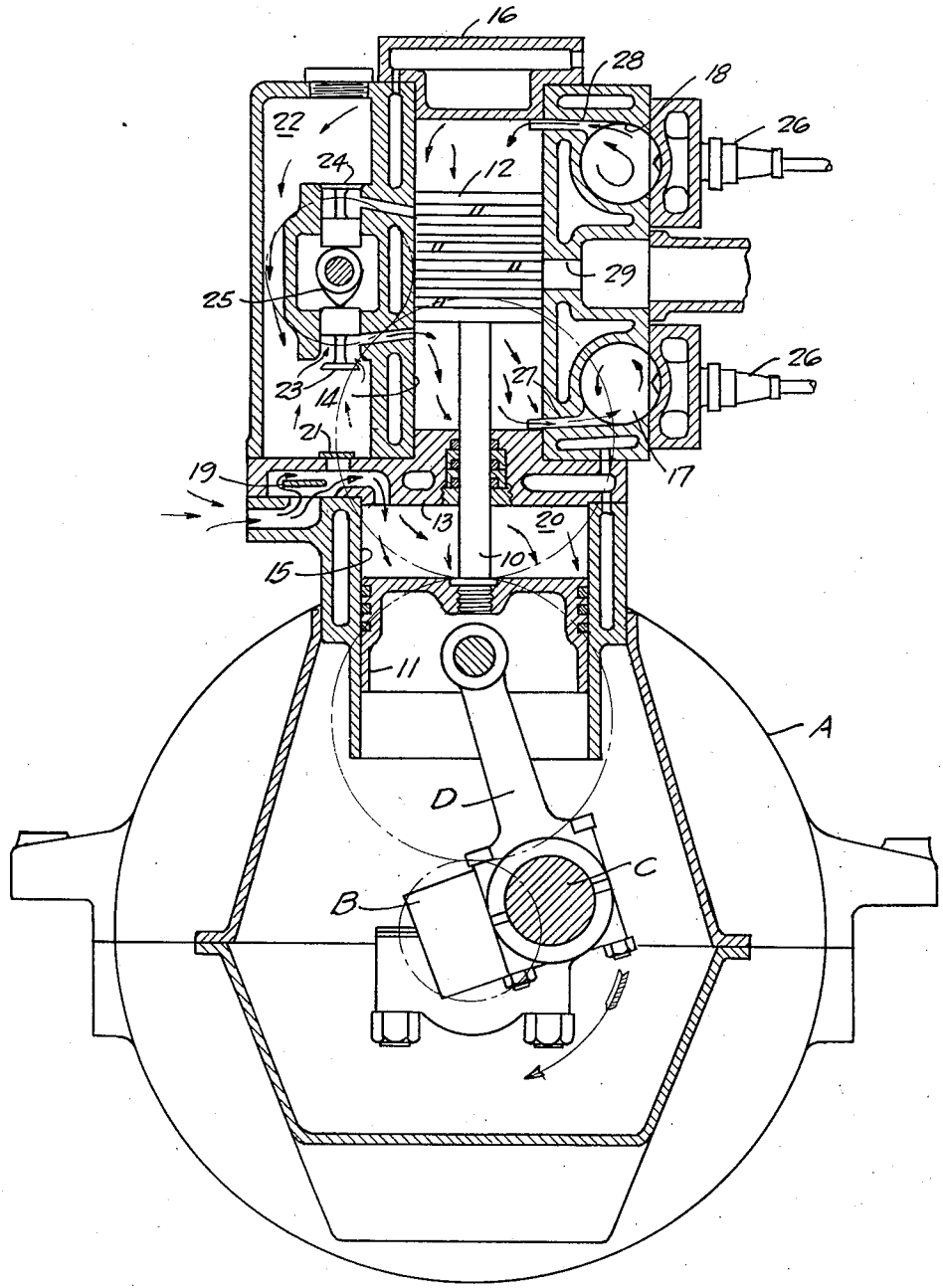
Figure 3:
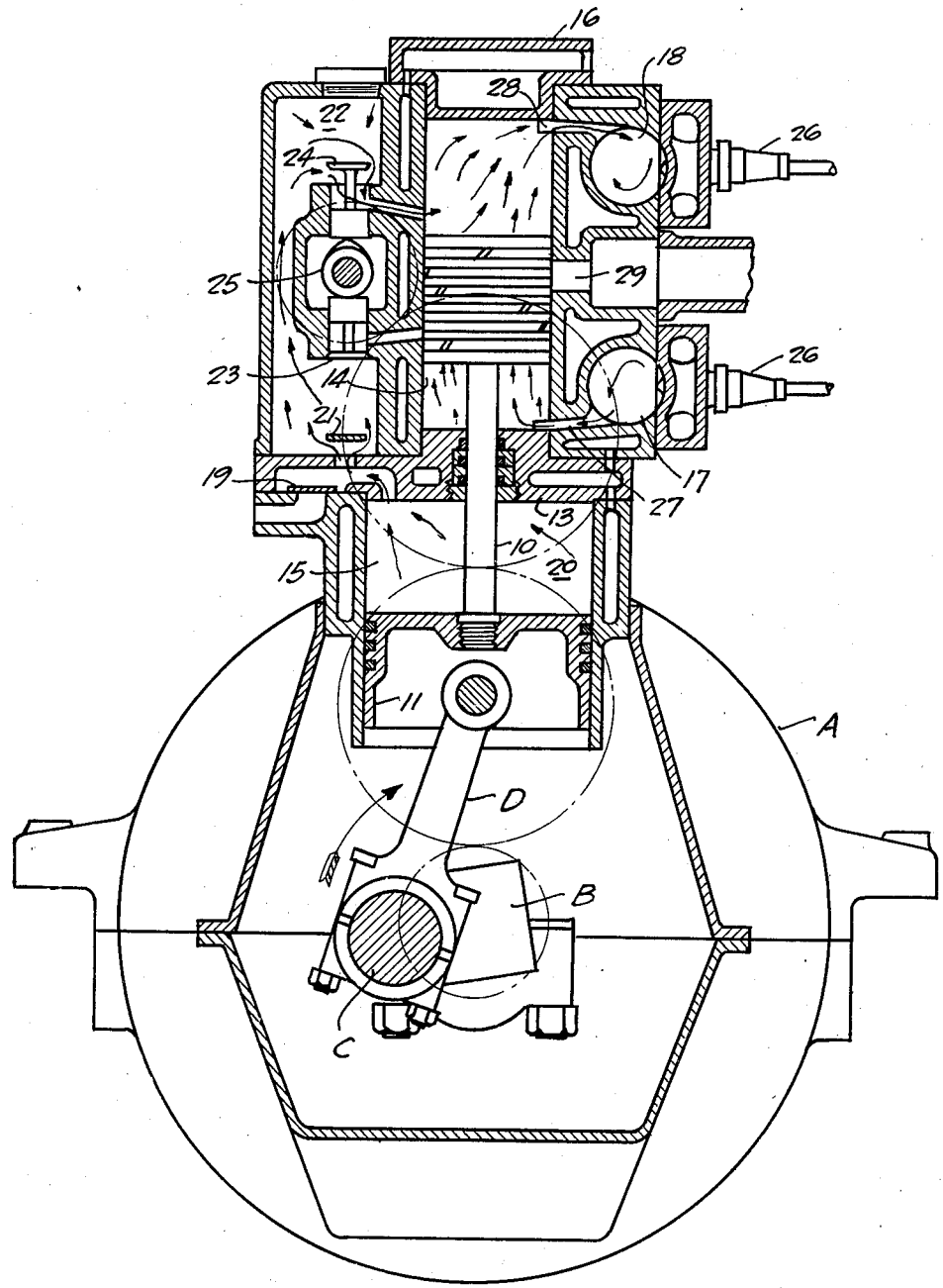
Figure 4:
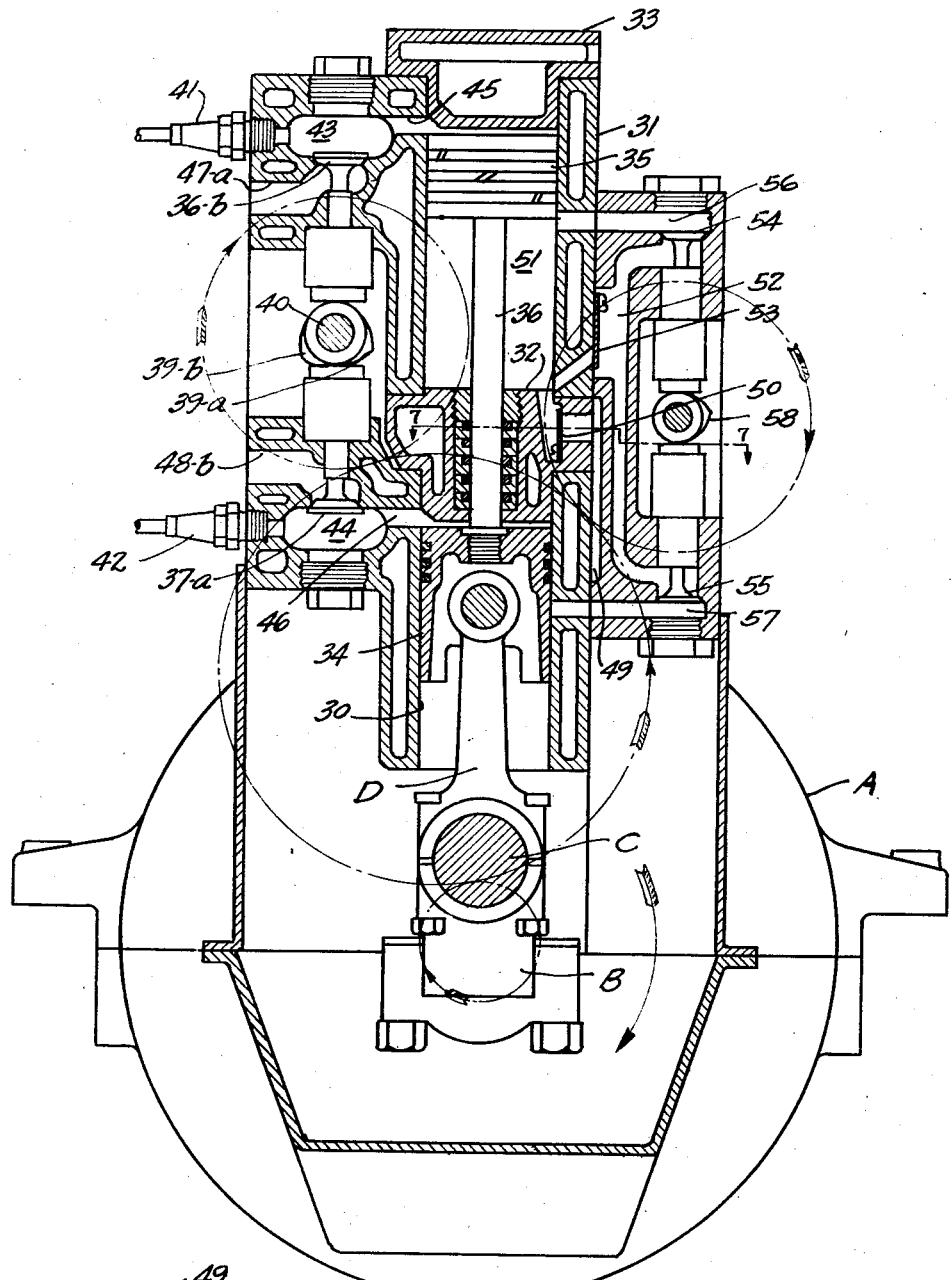
Figure 7:
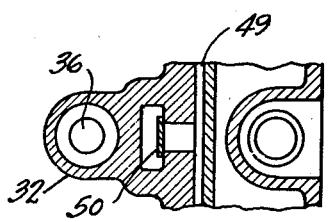
Figure 5:
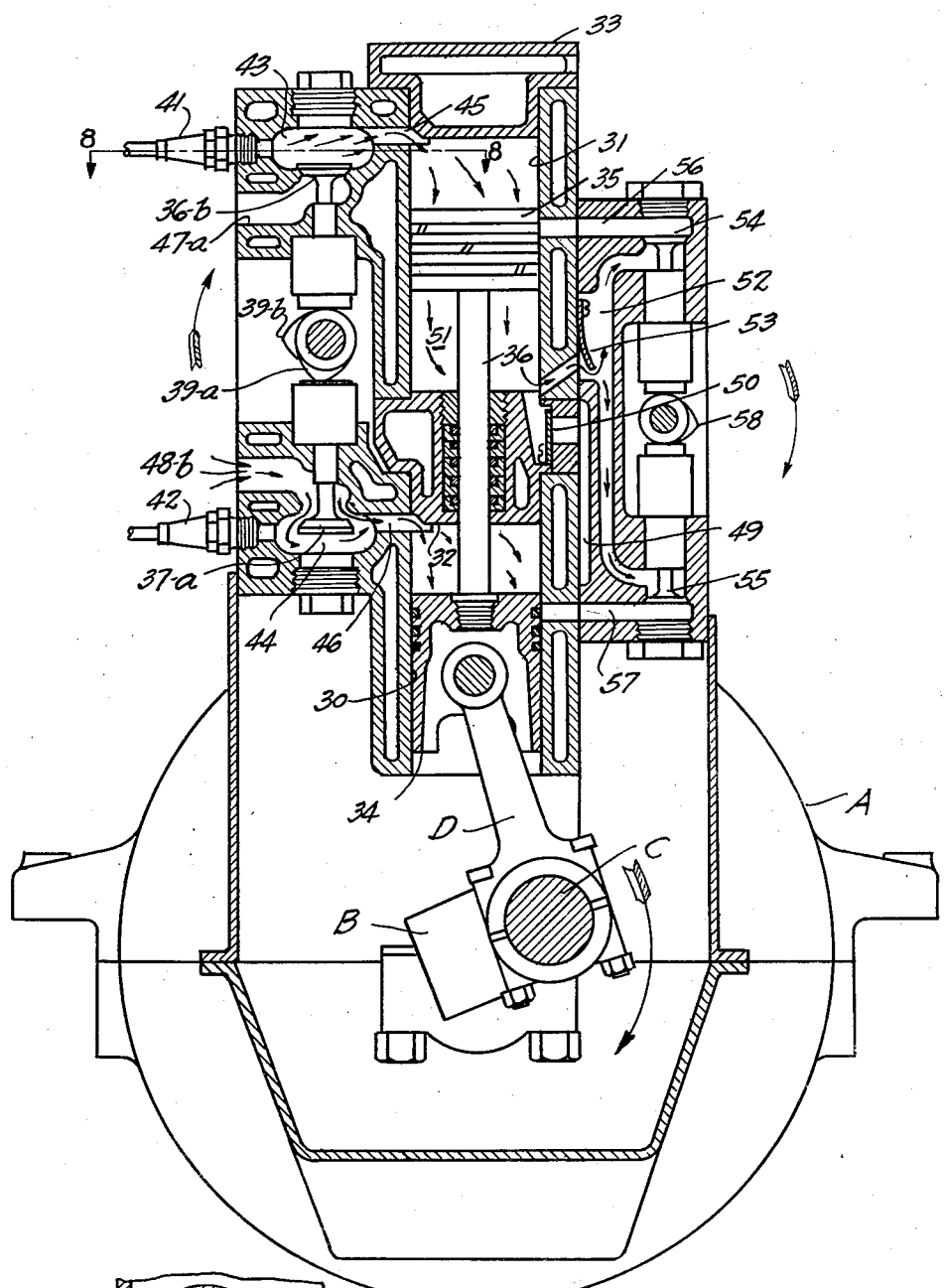
Figure 8:
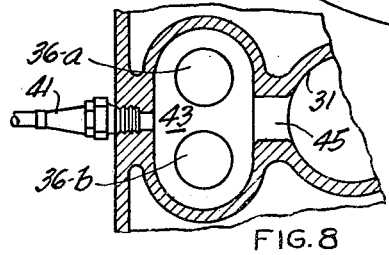
Figure 6:
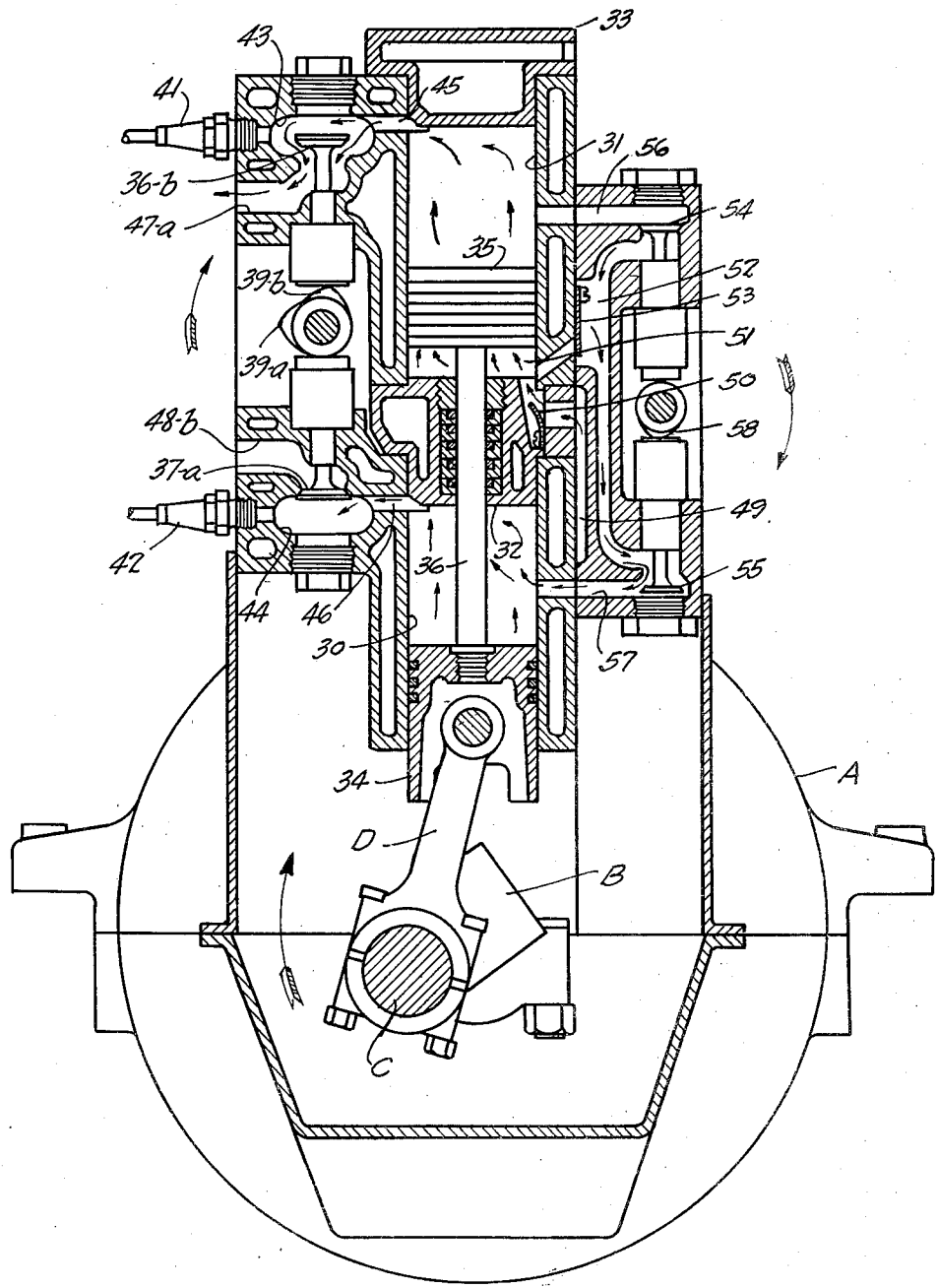

Figs. 1, 2, and 3 show my invention as applied to a double acting two-stroke cycle engine; Figs. 4, 5 and 6 show its application to a tandem four-stroke cycle engine; Fig. 7 is a section of a fragment as seen on the line 7—7 of Fig. 4; and Fig. 8 is a section of a fragment as seen on the line 8—8 of Fig. 5. Figs. 1 to 6 inclusive are cross sections showing the running gear for a single cylinder in different positions of the engine stroke and are typical for each running gear of a multiple cylinder engine.

Referring to Figs. 1, 2, and 3, the piston of a double acting two-stroke cycle engine is shown in Fig. 1 in its outer dead center position just at the beginning of the inner power stroke. Fig. 2 shows its position part way in on the inner power stroke, and Fig. 3 shows its position part way out on its outer power stroke.

Referring to Figs. 4, 5 and 6, the pistons of a tandem four-stroke cycle engine are shown in Fig 4 in their outer dead center positions just at the beginning of the inner strokes. Fig. 5 shows their positions part way in on the inner strokes, and Fig. 6 shows their positions part way out on the outer strokes.

Inasmuch as Figs. 1 to 6 inclusive are typical, like reference characters are used throughout for similar parts in the following description, in which an internal combustion engine A is provided with crank shaft B and crank pin C. Connecting rod D connects crank pin C with the inner piston.

Referring to Figs. 1, 2, and 3, piston rod 10 joins inner piston 11 to the outer piston 12 by passing through the inner cylinder head 13 which is provided with gland adapted to seal against the leakage of pressure between cylinder 14 and cylinder 15. Inner piston 11 and outer piston 12 are adapted to reciprocate in cylinder 15 and cylinder 14 respectively and are provided with the usual piston rings to seal against pressure leakage. Outer cylinder head 16 closes the outer end of cylinder 14. Combustion chambers 17 and 18 are arranged to communicate with their respective power pistons.

Compressor suction valve 19 controls passage of air to compressor chamber 20 by way of inlet passages, and compressor discharge valve 21 controls passage of compressed air by way of passages to discharge into receiver 22. Selector valves 23 and 24 permit air from the receiver 22 to flow into the power cylinders and are actuated by a cam 25 which is driven from the crank shaft B by means of suitable gearing indicated by dash and dot lines. The valve gearing is of the conventional type enabling timing adjustment to be made. In a compression ignition engine, 26 represents fuel injection nozzles whereas if spark ignition is employed 26 represents spark plugs. Ports 27 and 28 communicate between the combustion chambers 17 and 18 and the power cylinder.

Referring to Fig. 1, it will be noted that the pistons 11 and 12 are on the outer dead center position. Piston 12 is just receiving its power impulse derived from the burning of fuel in combustion chamber 18, while piston 11 has just completed its compression stroke in pressing air through discharge valve 21 and into air receiver 22. The inner power cylinder at this position is exhausting through the exhaust port 29.

Fig. 2 shows the two-stroke cycle piston part way in on its inner stroke. It will be noted that piston 12 has closed exhaust port 29 and the inner power cylinder is receiving air from the receiver 22 through the selector valve 23. It will be noted also that the inner power cylinder also contains the exhaust gases trapped between the piston and cylinder head after the exhaust port 29 was closed so that the entire volume of gases compressed in the inner power cylinder is represented by the volume of the trapped exhaust gases and the volume of air admitted through selector valve 23. During this inner stroke, air compressor piston 11 is sucking in air through compressor suction valve 19.

Fig. 3 shows the piston of a two-stroke cycle engine during its outer stroke. It will be noted that the same cycle of events just described for the inner power cylinder is now taking place in the outer power cylinder. Air compressor piston 11 is now on its compression stroke and is compressing air through compressor discharge valve 21 into air receiver 22.

From the foregoing description it is apparent that the volume of the compression space of the power cylinders are controllable as to size. Selector valves 23 and 24 being actuated from the crank shaft may be timed to open where desired, but always during the compression event. Early opening of selector valves 23 and 24 may be arranged so that air from receiver 22 will scavenge all or part of exhaust gases from the power cylinders. If arranged for late timing, selector valves 23 and 24 may be caused to open after exhaust port 29 is closed by the piston, thereby trapping a maximum of exhaust gases. The amount of air introduced into the power cylinder through the selector valves 23 and 24 is determined entirely by the displacement of the compressor piston 11. It becomes apparent therefore that the volumes of combustion chambers 17 and 18 may be constructed of any capacity desired.

This is of particular importance on small Diesel engines where compression ignition is employed. To illustrate:—Assuming a conventional engine with a cylinder having fifty cubic inches piston displacement, the volume of the combustion chamber could not exceed four cubic inches with absolute assurance of proper ignition. If my invention were employed having a compressor piston 11 so constructed as to provide one hundred fifty cubic inches of free air per stroke to the air receiver 22, then the total volume of free gases to be compressed by the power piston per stroke would be one hundred twenty five cubic inches, which would include seventy five cubic inches of air and fifty cubic inches of exhaust gases trapped from the previous power stroke. Under such conditions, combustion chambers 17 and 18 could be provided having a volume of ten cubic inches each, or two and one-half times as large as could be obtained in a conventional design.

The greatest difficulty in the manufacture and operation of Diesel engines in smaller sizes occurs in the combustion chamber because of its small size which is responsible for fuel striking metal walls, thereby causing smoke and unreliable operating conditions.

Referring more particularly to Figs. 4 to 8 inclusive, the engine, crank shaft, crank and connecting rod are marked respectively A, B, C, and D. Engine A comprises inner cylinder 30 and outer cylinder 31 with an inner cylinder head 32 provided with a packing gland. An outer cylinder head 33 closes the outer end of outer cylinder 31. An inner piston 34 is connected to an outer piston 35 by a piston rod 36. Pistons 34 and 35 are adapted to be reciprocated in cylinders 30 and 31 respectively. Inner cylinder 30 represents the inner power cylinder. The outer power cylinder 31 uses the outer head 33 and outer face of piston 35 for energizing the running gear, and the inner face of piston 35 and the inner head 32 is utilized as a compressor for supercharging the power cylinders. It is evident however that piston 34 could be utilized for a compressor piston or the outer face of piston 35 and the outer head 33 for a compressor if so desired.

Valves 36a and 36b are the conventional inlet and exhaust valves for the outer power cylinder. Likewise, valve 37a is the conventional inlet valve for the inner power cylinder, there being a companion exhaust valve not shown, for inlet valve 37a. The inlet and exhaust valves for each power cylinder lie side by side as shown in Fig. 8 and are operated by cams 39a and 39b. The cams 39a and 39b are mounted on a shaft 40 operated from the crank shaft B by intermediate gearing shown in dot and dash lines in Fig. 4. This valve gearing is of the conventional type enabling timing adjustment to be made. In a compression ignition engine, 41 and 42 represent fuel injection nozzles, whereas if spark ignition is employed, 41 and 42 represent spark plugs. The nozzles or spark plugs are disposed in combustion chambers 43 and 44 communicating with the power cylinders by ports 45 and 46. Intake port 47a permits air or the mixture charge to enter the power cylinder in the conventional manner independent of the additional charging means furnished by the air compressor. Port 48b permits the exhaust gases to pass from the other power cylinder. Beside intake port 47a is an exhaust port, not shown, for its power cylinder and beside exhaust port 48b is an intake port, not shown, this being the conventional construction.

Referring to the air compressor valve structure in Figs. 4 to 8, an air intake port is marked 49 and opens at its sides to the atmosphere as indicated in Fig. 7. At the other end is a compressor suction valve 50 to admit air to the compressor chamber 51 between the inner face of piston 35 and the inner head 32. A port connects the compressor chamber 51 with the receiver 52 and is controlled by a compressor discharge valve 53. Selector valves 54 and 55 permit air from the receiver 52 to flow into the power cylinders by way of ports 56 and 57. The selector valves are actuated by a cam 58 which is driven from crank shaft B by suitable gearing.

Fig. 4 shows a tandem four-stroke cycle engine in its outer dead center position just at the beginning of the power stroke of the outer piston.

Fig. 5 shows the piston part way in on the inner power stroke of the outer piston. It will be noted that inlet valve 37a is now open permitting air to flow into the inner cylinder and that compressed air is flowing from the compressor chamber 51 through compressor discharge valve 53 into receiver 52.

Fig. 6 shows the outer stroke in which exhaust valve 36b is open thus permitting exhaust gases from the outer power cylinder to escape. Inlet valve 37a is now closed and inner piston 35 is on its compression stroke. Selector valve 55 is now open thus permitting air from receiver 52 to flow into the inner power cylinder. Air compressor discharge valve 53 is now closed and the compressor chamber is receiving a fresh supply of air through compressor intake valve 50. The same cycle of events just described are repeated in the next revolution of the engine except that piston 34 comes on its power stroke and the outer power piston comes on its suction stroke.

In the foregoing description of my invention as applied to a four-stroke cycle engine, it becomes apparent that the volume of air supplied to the power cylinders is augmented by the compressor cylinder. To illustrate:—Assuming an engine having a piston displacement of fifty cubic inches and a compressor piston as described having a piston displacement of fifty cubic inches, the total volume of air supplied to the power cylinder would be one hundred per cent greater than the volume of air the power cylinder would receive if the compressor were omitted. It becomes evident that the combustion chamber of an engine equipped with my invention could be made of twice the capacity of that of an engine designed along conventional lines.

Inasmuch as the potential output of an engine is in proportion to the quantity of air it receives, the application of my invention would augment its power output, thereby accomplishing the objects of increased power, decreased cost and weight.

The ability to increase the size of the combustion chamber by the use of my invention permits the use of compression ignition in small engines and eliminates the danger of fuel striking metal surfaces, thus fulfilling a further object of my invention, that of increased reliability.

In general, two-stroke cycle engines have proven unpopular where used on installations having wide variations of loads and speeds. Pressure surges set up in the exhaust piping of such engines have a tendency to cause irregularities in the supply of charging air. Since my invention permits of two cycle construction without the use of air intake and scavenging ports and since the supply of air is governed entirely by the quantity supplied from the air compressor, the objections referred to are entirely eliminated. With the increased volume of pressure space possible with my invention the construction of L head engines operating under high compression pressures is entirely possible. Since the ability to dispel heat to the water jacket is proportional to the area of the radiating surfaces, the L head construction provides better facilities for getting rid of heat than though the combustion chamber were provided in the cylinder head.

Although the potential output of an engine is in proportion to the air it receives, the practical output is limited by the ability to get rid of heat. My invention permits of great overload capacity. To illustrate:—Let us compare a single acting four-stroke cycle engine with a two-stroke cycle double acting engine constructed as shown in Figs. 1 to 3 and having one hundred per cent supercharging capacity. Such a two-stroke cycle engine would have eight times the potential power capacity of the four-stroke cycle engine having the same bore and stroke. This is of great importance for instantaneous overloads and provides torque characteristics comparable with those of a direct current electric motor and, as in the electric motor, such power outputs can be obtained only for short periods of time. Such an engine is particularly useful in locomotives, rail cars and certain industrial equipment where great torque over short periods of time is desired.

It is apparent that the L head construction presents far greater simplicity in valve gearing and maintenance than does the conventional combustion chamber provided in the cylinder heads.

In the conventional high pressure engine, the problem of starting, particularly when hand starting or electric starters are used, become quite serious. Compression relief devices are usually provided and are needed even in spotting the engine. My invention greatly simplifies the starting problem. Referring to Figs. 1 to 6, it becomes apparent that in starting the engine the pressures built up in the compression space are low on the first stroke of the engine, but gradually build up as the engine continues rotating until the power cylinder receives its full charge of air from the air receiver. With the gradual building up of pressure, it is apparent that compression relief devices become unnecessary.

Conventional tandem and double acting engines are equipped with a cross head and guide operating in the engine crank case. In my invention I have substituted a piston and cylinder in place of a cross head and guide.

What I claim is:—

1. In an internal combustion engine having two separate power displacement chambers, a compressor displacement chamber and two separate combustion chambers; the combination of two cylinders in axial alinement, pistons reciprocatingly mounted in said cylinders and displacement chambers, a piston rod connecting said pistons, a connecting rod articulated to the inner piston and adapted to be connected to a crank pin, one of said pistons being double acting; an air suction intake for said compressor chamber, a discharge passage for said compressor chamber, an air receiver chamber communicating with said discharge passage, means to direct compressed air from said receiver chamber to said power displacement chambers including positively operated selector valve means for alternately directing compressed air from the receiver to one power displacement chamber during its compression event and then to the other power displacement chamber during its compression event.

2. In an internal combustion engine having two separate power displacement chambers, a compressor displacement chamber and two separate combustion chambers; the combination of two cylinders in axial alinement, pistons reciprocatingly mounted in said cylinders and displacement chambers, a piston rod connecting said pistons, a connecting rod articulated to the inner piston and adapted to be connected to a crank pin, one of said pistons being double acting; an air suction intake for said compressor chamber, a discharge passage for said compressor chamber, an air receiver chamber communicating with said discharge passage, means to direct compressed air from said receiver chamber to said power displacement chambers including positively operated selector valve means for alternately directing compressed air from the receiver to one power displacement chamber during its compression event and then to the other power displacement chamber during its compression event, and means for timing said selector means.

3. In an internal combustion engine having two separate power displacement chambers, a compressor displacement chamber and two separate combustion chambers; the combination of two cylinders in axial alinement, pistons reciprocatingly mounted in said cylinders and displacement chambers, a piston rod connecting said piston, a connecting rod articulated to the inner piston and adapted to be connected to a crank pin; there being passages between said power displacement chambers and combustion chambers whereby the power generated in one of said combustion chambers acts on said inner piston and the power generated in the other of said combustion chambers acts on said outer piston, the compressor displacement chamber being formed by said outer cylinder and outer piston; an air suction intake for said compressor chamber, a discharge passage for said compressor chamber, an air receiver chamber communicating with said discharge passage, means to direct compressed air from said receiver chamber to said power displacement chambers including positively operated selector valve means for alternately directing compressed air from the receiver to one power displacement chamber during its compression event and then to the other power displacement chamber during its compression event.

4. In an internal combustion engine having two separate power displacement chambers, a compressor displacement chamber and two separate combustion chambers; the combination of two cylinders in axial alinement, pistons reciprocatingly mounted in said cylinders and displacement chambers, a piston rod connecting said pistons, a connecting rod articulated to the inner piston and adapted to be connected to a crank pin; there being passages between said power displacement chambers and combustion chambers whereby the power generated in one of said combustion chambers acts on said inner piston and the power generated in the other of said combustion chambers acts on said outer piston, the compressor displacement chamber being formed by said outer cylinder and outer piston; an air suction intake for said compressor chamber, a discharge passage for said compressor chamber, an air receiver chamber communicating with said discharge passage, means to direct compressed air from said receiver chamber to said power displacement chambers including positively operated selector valve means for alternately directing compressed air from the receiver to one power displacement chamber during its compression event and then to the other power displacement chamber during its compression event and means for timing said selector valve means.

5. In an internal combustion engine having two separate power displacement chambers, a compressor displacement chamber and two separate combustion chambers; the combination of two cylinders in axial alinement, pistons reciprocatingly mounted in said cylinders and displacement chambers, a piston rod connecting said pistons, a connecting rod articulated to the inner piston and adapted to be connected to a crank pin; there being passages between said power displacement chambers and combustion chambers whereby the power generated in both of said combustion chambers whereby the power generated in both of said combustion chambers acts on said outer piston; the compressor displacement chamber being formed by said inner cylinder and inner piston; an air suction intake for said compressor chamber, a discharge passage for said compressor chamber, an air receiver chamber communicating with said discharge passage, means to direct compressed air from said receiver chamber to said power displacement chambers including positively operated selector valve means for alternately directing compressed air from the receiver to one power displacement chamber during its compression event and then to the other power displacement chamber during its compression event.

6. In an internal combustion engine having two separate power displacement chambers, a compressor displacement chamber and two separate combustion chambers; the combination of two cylinders in axial alinement, pistons reciprocatingly mounted in said cylinders and displacement chambers, a piston rod connecting said pistons, a connecting rod articulated to the inner piston and adapted to be connected to a crank pin; there being passages between said power displacement chambers and combustion chambers whereby the power generated in both of said combustion chambers acts on said outer piston; the compressor displacement chamber being formed by said inner cylinder and inner piston; an air suction intake for said compressor chamber, a discharge passage for said compressor chamber, an air receiver chamber communicating with said discharge passage, means to direct compressed air from said receiver chamber to said power displacement chambers including positively operated selector valve means for alternately directing compressed air from the receiver to one power displacement chamber during its compression event and then to the other power displacement chamber during its compression event, and means for timing said selector valve means.

7. An internal combustion engine of the compression ignition type comprising a piston, a cylinder within which it reciprocates, a compression space at the end of the cylinder within which inert gases are entrapped and which space augments the capacity of the cylinder in excess of that required to compress a normal explosive charge, and means automatically acting to add an amount of air to the inert gases entrapped so that the combined quantity of air and gases within said compression space will be in direct proportion to the augmented capacity of said compression space.

8. An internal combustion engine of the double acting two cycle compression ignition type comprising a piston, a cylinder within which the piston reciprocates, a compression space at each end of the cylinder within which inert gases are entrapped and which space augments the capacity of the compression space at opposite ends of the cylinder in excess of that required to compress a normal explosive charge and supplemental means acting in synchronism with the movement of the piston to add an amount of air to the inert gases entrapped so that the combined quantity of air and gases within the compression spaces will be in direct proportion to the augmented capacity of said compression spaces whereby the heat radiating capacity of the cylinder will be substantially increased above that normally produced by piston displacement alone.

LLOYD E. ELWELL.